United States Patent [19]
Oshidari

[11] Patent Number: 6,106,431
[45] Date of Patent: Aug. 22, 2000

[54] TOROIDAL TYPE CONTINUOUSLY VARIABLE TRANSMISSION

[75] Inventor: Toshikazu Oshidari, Yokosuka, Japan

[73] Assignee: Nissan Motor Co., Ltd., Yokohama City, Japan

[21] Appl. No.: 09/064,146

[22] Filed: Apr. 22, 1998

[30] Foreign Application Priority Data

Apr. 22, 1997 [JP] Japan ................................. 9-104673
Aug. 12, 1997 [JP] Japan ................................. 9-217743

[51] Int. Cl.[7] .............................................. F16H 15/38
[52] U.S. Cl. ............................ 476/40; 476/42; 476/46
[58] Field of Search .................................. 476/2, 40, 41, 476/42, 43, 46, 10

[56] References Cited

U.S. PATENT DOCUMENTS

| | | | |
|---|---|---|---|
| 4,444,068 | 4/1984 | Kraus | 476/43 |
| 5,033,322 | 7/1991 | Nakano | 476/42 |
| 5,067,360 | 11/1991 | Nakano | 476/42 |
| 5,136,890 | 8/1992 | Hibi et al. | |
| 5,419,746 | 5/1995 | Nakano | 476/42 |
| 5,538,483 | 7/1996 | Kobayashi et al. | 476/42 |
| 5,607,372 | 3/1997 | Lohr | |
| 5,676,618 | 10/1997 | Nakano et al. | 476/40 |
| 5,893,815 | 4/1999 | Nakano | 476/42 |

FOREIGN PATENT DOCUMENTS

| | | |
|---|---|---|
| 0 450 495 | 10/1991 | European Pat. Off. . |
| 44 44 952 | 6/1995 | Germany . |
| 1-021261 | 1/1989 | Japan . |

Primary Examiner—David A. Bucci
Assistant Examiner—William C Joyce
Attorney, Agent, or Firm—Foley & Lardner

[57] ABSTRACT

A toroidal type CVT has upper and lower links. The upper link has a link supporting member joined to its casing and the lower link has a link supporting member joined to a cylinder body. An adjusting hole and a knock pin are used to permit displacement of either the upper or the lower link within a predetermined limit in the longitudinal direction of the link. This adjustment equalizes the thrust forces acting on the power rollers, which are gripped between an input and output disks, and maintains the torque transmission efficiency at an optimum level.

4 Claims, 9 Drawing Sheets

TOROIDAL TYPE CONTINUOUSLY VARIABLE TRANSMISSION

FIELD OF THE INVENTION

The present invention relates to a structural improvement of a trunnion of a toroidal type continuously variable transmissions used for vehicles.

BACKGROUND OF THE INVENTION

An example of a link structure for supporting a trunnion of a toroidal continuously variable transmission is disclosed in Tokkai Hei 1-21261 published by the JapanesePatent Office.

In this toroidal type continuously variable transmission, a pair of power rollers is gripped between an input disk and an output disk arranged facing each other, and a rotation of the input disk is transmitted to the output disk via a power roller. The power roller is connected to a trunnion via an eccentric shaft. When this trunnion moves in its axial direction due to an actuator, the power roller performs a swing motion essentially around the trunnion. The contact position of the roller relative to tile input disk and output disk varies according to this oscillation angle, and the rotation ratio transmitted to the output disk from the input disk is therefore made to vary continuously.

The pair of power rollers is gripped between the input disk and the output disk. The magnitude of the rotation torque which can be transmitted is determined by the force with which the rollers are gripped. When this grip force is low, the power roller slips when a large torque acts, and the transmission efficiency of the disk rotation torque drops. It is most desirable that the rotation torque be transmitted equally by both power rollers, and for this purpose the grip pressures on both power rollers must be equalized. When the grip pressure acting on one power roller is low, the transmission torque is limited.

However, insofar as concerns the trunnion, each end of which is connected with a first and second links, a moment according to the direction of rotation acts on the pair of power rollers during power transmission, and the grip pressure on each power roller therefore can become different. Specifically, since the power rollers are arranged facing each other on either side of the rotation axis of the input and output disk, one power roller is pushed into between the input and output disk due to the moment accompanying the rotation, so that the grip force is high, but the other power roller is pushed out of the disks so that the grip force acting on it is low. The torque transmitted by each of the power rollers will therefore be different. Also even if the power rollers are fitted so as to cancel the influence of the aforesaid moment when the toroidal type continuously variable transmission is assembled, if there are still dimensional errors in the power roller fitting position, it will be impossible to set the grip pressure on both power rollers exactly according to design specifications. However, it is very difficult and very costly to completely eliminate dimensional errors.

SUMMARY OF THE INVENTION

It is therefore an object of the present invention to provide a toroidal type continuously variable transmission wherein the efficiency of transmitting a rotation torque is optimized.

The invention also effectively equalizes grip pressure on both power rollers by a simple structure, and provides a toroidal type continuously variable transmission which permits optimum transmission efficiency of rotation torque to be maintained.

Further, the invention provides a toroidal type continuously variable transmission which can equalize the grip pressures on the power rollers even when there is a dimensional error.

In order to achieve the above objects the invention provides a toroidal continuously variable transmission comprising a pair of coaxial input and output disks having toroidal conical surfaces facing each other, a pair of trunnions arranged in a plane perpendicular to the rotation axis of the input and output disks and each capable of displacement along an axis and around an axis, a power roller supported by the trunnion free to rotate about an eccentric axis in same, the power roller being gripped between the input and output disks, actuators for driving the pair of trunnions in mutually opposite axial directions, a first link connecting one end of each of the trunnions at opposite side of the actuators, the center part of this link being supported free to pivot about a first link supporting member, a second link connecting the other end of each of said trunnions, the center part of this link being supported free to pivot about a second link supporting member, adjusting means for permitting the displacement of the first or second link supporting member within predetermined limits so as to cause either the first or second link to displace within predetermined limits in the longitudinal direction of the link joining the pair of trunnions.

It is preferable that the adjusting means comprises an oblong hole for restricting the displacement of the first or second link supporting member within predetermined limits in the longitudinal direction of the link, a knock pin provided in the casing which passes through the adjusting hole, and tightening means for selectively fixing said link supporting member to the casing.

It is also preferable that the adjusting means comprises an oblong hole for restricting the displacement of the first link supporting member within predetermined limits in the longitudinal direction of the link, a bolt provided in the casing which passes through the adjusting hole and a pair of collars for gripping the first link supporting member.

It is also preferable that the adjusting means comprises a knock pin provided in either a body to which the actuators are fitted or the casing, an adjusting hole provided in the other of the body or casing for permitting displacement of the second link supporting member in the longitudinal direction of the link, and tightening means for selectively fixing the body to the casing.

It is also preferable that the actuators comprise means for permitting displacement within predetermined limits in a direction perpendicular to the axial direction.

It is also preferable that the actuators be hydraulic cylinders, the trunnions be driven in an axial direction due to the motion of pistons of the cylinders, and the means which permits displacement in a perpendicular direction to the axial direction comprises a gap in sliding parts between the cylinders and the pistons, and a seal ring for sealing this sliding gap.

The dstails as well as other features and advantages of the invention are set forth in the remainder of the specification and are shown in the accompanying drawings.

DESCRIPTION OF THE PREFERRED EMBODIMENTS

Figure 1:
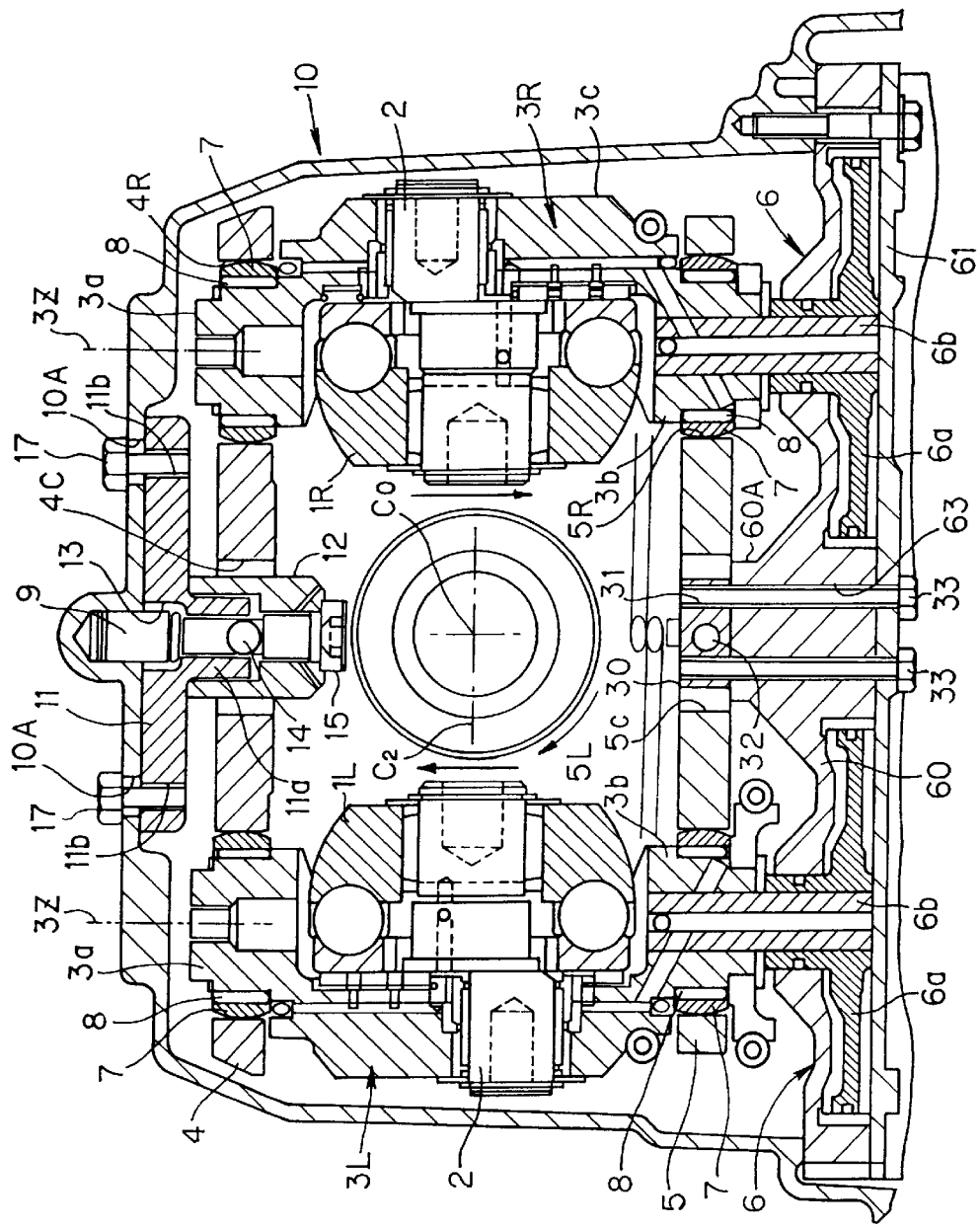
FIG. 1 is a cross-sectional view of a toroidal type continuously variable transmission showing an embodiment of the invention.
Figure 2:
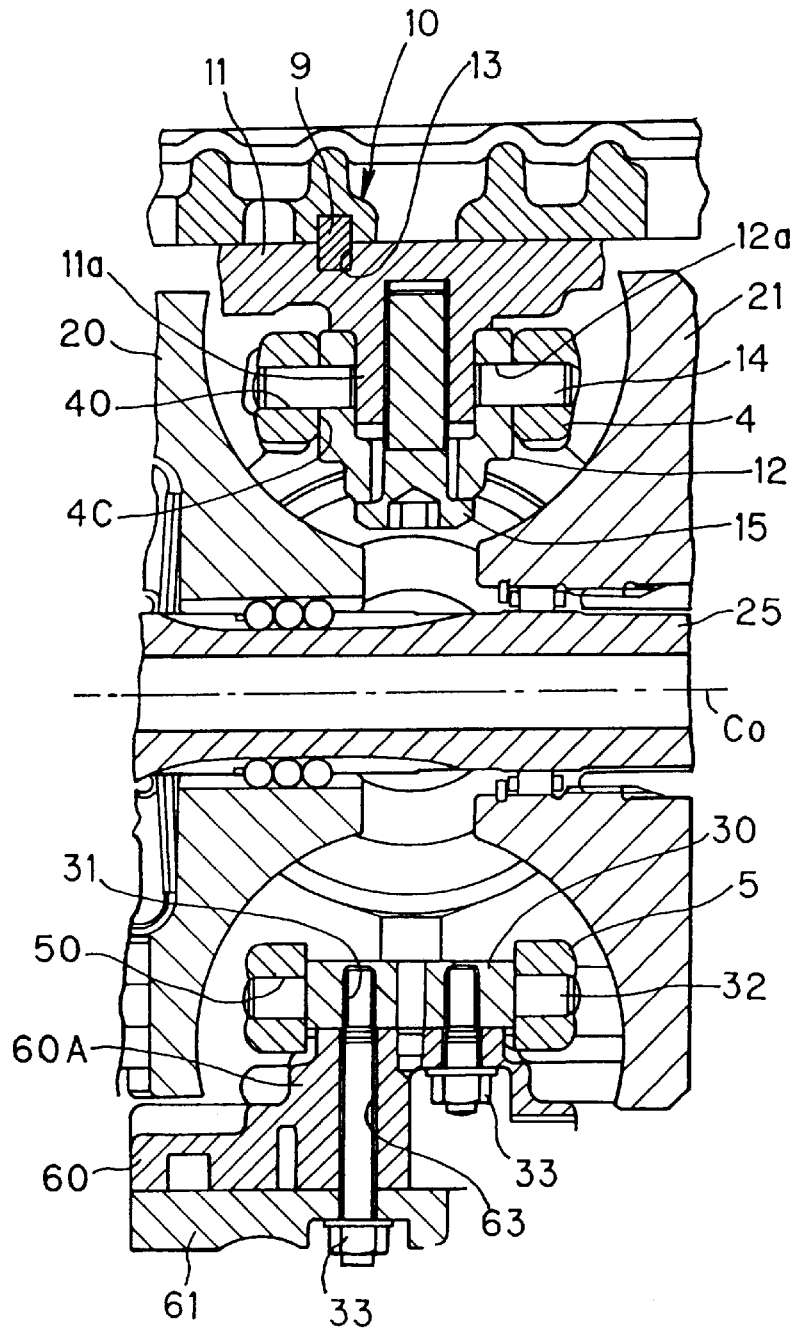
FIG. 2 is a cross-section taken along a line I—I of FIG. 1.
Figure 3:
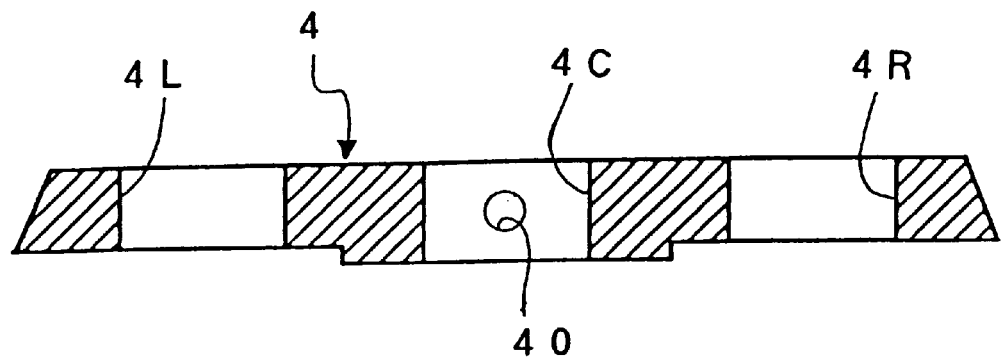
FIG. 3 is a cross-section of the upper link.

A form of a preferred embodiment of this invention will now be described referring to the drawings. In FIG. 1–FIG. 3, an input disk 20 and output disk 21 having toroidal conical surfaces are arranged facing each other on the same axis. A pair of power rollers 1L, 1R gripped by these input and output disks 20, 21 are supported free to rotate via pivot shafts 2, 2 (eccentric shafts) relative to a pair of trunnions 3L, 3R disposed on either side of a rotation axis C0 of the input and output disks 20, 21 as shown in FIG. 1.

The input disk 20 and output disk 21 are arranged on an input shaft 25 as shown in FIG. 2. The input disk 20 is joined to the input shaft 25 in the direction of rotation, but the output disk 21 is supported free to rotate relative to the input shaft 25.

The inclination angles (swing angles) of the power rollers 1L, 1R vary according to displacement in the axial directions of the trunnions 3L, 3R as described hereafter. The contact positions of the power rollers 1L, 1R relative to the input and output disks 20 and 21 (rotation radii) therefore vary, and the rotation of the input disk 20 is transmitted to the output disk 21 with a varying ratio. In other words, the speed change ratio is made to vary continuously.

In FIG. 1, shanks 3a, 3b coaxial with rotation axis 3z are formed at the upper and lower ends of the trunnions 3L, 3R disposed to the left and right of the rotation shaft C0 of the input and output disks 20, 21 in a plane perpendicular to the rotation shaft C0 (axis of input and output shaft 25). An offset part 3c which is offset by a predetermined amount from the aforesaid rotation axis 3z in the circumferential direction of the input and output disks 20, 21, is formed between these shanks 3a and 3b. The base end of the aforesaid pivot shaft 2 is supported to the offset part 3c at right angles to the rotation axis 3z of the trunnion.

The shank 3b at the lower end of the trunnion is joined to a piston 6a of a hydraulic cylinder 6 which can displace in the axial direction of and rotate around the rotation axis 3z via a rod 6b. The trunnions 3L, 3R are displaced along the rotation axes 3z to the top and bottom direction of the figure by supplying an oil pressure to the hydraulic cylinder 6. Due to displacement of these trunnions 3L, 3R in the axial direction, a component force acts on the power rollers 1L, 1R in a direction tending to incline the rollers, and the trunnions rotate around the rotation axis 3z together with the power rollers. The contact position of each power roller relative to the input disk 20 and output disk 21 is thereby changed, and the transmission ratio of the rotation speed varies accordingly.

The aforesaid hydraulic cylinder 6 is formed inside a cylinder body 60 joined to the casing 10.

At the same time, the shanks 3a, 3b at the upper end and lower end of the facing trunnions 3L, 3R are connected via an upper link 4 (first link) free to pivot and lower link 5 (second link) free to pivot in a plane at right angles to the rotation shaft C0 of the input and output disk 20, 21. This upper link 4 and lower link 5 support thrust forces (forces in the circumferential direction of the disks) acting on the power rollers 1L, 1R attached to the pivot shafts 2, 2.

The shanks 3a, 3b of the trunnions 3L, 3R pass through throughholes 4L, 4R and 5L, 5R provided at either end of respectively the upper link 4 and lower link 5 in a longitudinal direction, and link supporting members 12, 30 which extend in the up/down direction of the figure and toward the rotation shaft C0 of the input and output disks 20, 21 from the casing 10 and cylinder body 60, pass through throughholes 4C, 5C provided in the central parts of the upper link 4 and lower link 5. The link supporting members 12, 30 are respectively connected to the upper link 4 and lower link 5 by a pair of pins 14, 32.

Therefore when the left and right hydraulic cylinders 6, 6 drive the trunnions 3L, 3R in synchronism in mutually opposite axial directions, the upper link 4 and lower link 5 pivot essentially in a plane at right angles to the rotation shaft C0 of the input and output disks 20, 21 around the pins 14, 32 of the link supporting members 12, 30 according to the axial displacements of the trunnions 3L, 3R.

In order to permit this movement, a spherical bearing 7 and a needle bearing 8 on its inner circumference are interposed respectively between the shanks 3a, 3b of the trunnions 3L, 3R and the throughholes 4L, 4R and 5L, 5R at both ends of the upper link 4 and lower link 5. This permits the upper link 4 and lower link 5 to incline relative to the trunnions. However, the upper link 4 and lower link 5 restrict displacement of the rotation axes 3z of the trunnions 3L, 3R in a radial direction, and displacement of the rotation shafts 3z of the trunnions towards the outside is prevented by the thrust forces acting on the power rollers 1L, 1R.

The link supporting member 12, which supports the upper link 4 so that it, is free to pivot is formed of a cylindrical member having a throughhole at one end through which a bolt 15 passes, as shown in FIG. 2. The base ends of pins 14, 14, which allow the upper link 4 to pivot, freely engage with a pair of throughholes 12a provided on both sides of the cylindrical member, these pins 14, 14 being arranged parallel to the rotation shaft C0 of the input/output disks 20, 21.

At the same time, throughholes 40, 40 which engage with these pins 14, 14 are formed parallel with the rotation shaft C0 in the upper link 4 at a part of the throughhole 4C. When the throughholes 40 of the upper link 4 are aligned with the throughholes 12a of the link supporting member 12, the upper link 4 can be made to pivot freely on the pins 14 by engaging the pins 14 with the throughholes 12a. The throughholes 4C are formed with a sufficiently large diameter so as not to interfere with the link supporting member 12 even when the upper link 4 pivots.

The link supporting member 12 is tightened to a positioning member 11 via the bolt 15 which passes through a throughhole in the base. This positioning member 11 is attached to the upper inner surface of the casing 10, and its installation position can be finely adjusted in the longitudinal direction of the upper link 4.

For this purpose, an oblong adjusting hole 13 engaging with a knock pin 9 previously fixed in the casing 10 is formed in the upper surface of the positioning member 11 which is in contact with the inner surface of the casing 10, and bolts 17, 17 for tightening the member 11 to the casing 10 are attached on both sides.

The adjusting hole 13 with which the knock pin 9 engages so as to perform fine adjustment of the positioning member 11, has a larger bore than the outer diameter of the knock pin 9 in the horizontal direction (left and right direction in figure=longitudinal direction of upper link 4) as shown in FIG. 1. At the same time, as shown in FIG. 2, in the direction of the rotation shaft C0 of the input and output disks 20, 21, it is formed in an oblong shape having an inner diameter of identical width to the outer diameter of the knock pin 9. Therefore when the knock pin 9 is engaged, the displacement of the positioning member 11 is permitted within a predetermined range in the longitudinal direction of the upper link 4, but is restricted in the direction of the rotation shaft C0.

In FIG. 1, screw holes 11b of the bolts 17 are formed respectively on both sides of the positioning member 11 in order to tighten the positioning member 11 to the casing 10. Oblong throughholes 10A, 10A are formed as adjusting means in the casing 10 facing these screw holes 11b, 11b. The bolts 17; 17 which are tightening means pass through these throughholes 10A, 10A and screw into the screw holes 11b, 11b of the positioning member 11. In this way, the positioning member 11 is joined to the casing 10. The throughholes 10A, 10A, are oblong in the same horizontal direction as the adjusting hole 13, i.e., in the longitudinal direction of the link 4, and permit displacement of the positioning member 11 in the horizontal direction when the bolts 17 are loosened.

A boss part 11a engaging with the inner circumference of the link supporting member 12 is formed in a lower surface opposite to the adjusting hole 13 of the positioning member 11, a screw hole for screwing the bolt 15 of the link supporting member 12 being formed in this boss part 11a.

On the other hand, a mount 60A to fix the link supporting member 30, which supports the lower link 5 free to pivot, extends upwards in the cylinder body 60 on the opposite side of the rotation shaft C0 of the input and output disks 20, 21.

The link supporting member 30 which supports the lower link 5 comprises screw holes 31, 31 for screwing in bolts 33 passing through the mount 60A in the up/down direction of the figure, and pins 32, 32 extend on both sides of the link supporting member 30 so that they are parallel with the rotation shaft C0 of the input and output disks 20, 21.

The pins 32 are fixed by engaging their bases with holes, not shown, in the link supporting member 30 as on the aforesaid upper link 4 side.

Further, in the center of the lower link 5 comprising the throughholes 5c, where in throughholes, not shown, which engage with these pins 32, 32 as in the case of the upper link 4 shown in FIG. 3 are also formed parallel to the rotation shaft C0. The lower link 5 is supported free to pivot around the pins 32 of the link supporting member 30 by engaging the pins 32 with these throughholes.

The link supporting member 30 of the lower link 5 is fixed by bolts 33 that pass through throughholes 63, 63 in the mount 60A, but even if the bolts 33 are loosened, it does not displace in the horizontal direction or in the direction of the rotation shaft C0.

Next, the adjustment of the power roller assembly will be described.

After assembling the toroidal type continuously variable transmission, the bolts 17, 17 that fix the positioning member 11 which supports the upper link 4 to the casing 10 are loosened.

By loosening the bolts 17, the positioning member 11 is allowed to move within predetermined small limits in the horizontal direction of FIG. 1 guided by the oblong throughholes 10A in the casing 10 and the oblong adjusting hole 13 which engages with the knock pin 9. On the other hand, displacement in the direction of the rotation shaft C0 of the input and output disks 20, 21 is not permitted. The upper link 4 which is supported free to pivot by the link supporting member 12, can therefore displace in its longitudinal direction together with the positioning member 11.

When the continuously variable transmission is rotated, and the input and output disks 20, 21 and power rollers 1L, 1R are rotated in this state, the upper link 4 is displaced in its longitudinal direction to a position in which the thrust forces acting on the power rollers 1L, 1R towards the outside, are balanced.

As the power rollers 1L, 1R are gripped by the input and output disks 20, 21, these thrust forces act on the power rollers in the radial direction of the disks and are in direct proportion to the power roller grip force.

In FIG. 1, the contact positions of the power rollers 1L, 1R relative to the input and output disks 20, 21 and the positions of the rotation axes 3z of the trunnions 3L, 3R are different. A moment therefore acts on the trunnions depending on the rotation direction of the input disk 20, and due to the addition of this moment, the thrust forces acting on the power rollers 1L, 1R will be different.

Specifically, the forces to which the left and right power rollers 1L, 1R are subjected by the input and output disks 20, 21 are in opposite directions on either side of the rotation shaft as shown by the arrows, and therefore the moments acting on the trunnions 3L, 3R are in the same direction. Hence the thrust force acting on one power roller 1R becomes larger than the thrust force acting on the other power roller 1L, and the grip pressures on each of the rollers 1L, 1R are different.

However, the trunnions 3L, 3R which support the power rollers 1L, 1R are connected by the upper link 4, so that if the upper link 4 is displaced to a position where the forces to left and right of the longitudinal direction of the upper link 4 are balanced, the thrust forces acting on the power rollers 1L, 1R will be equal.

When the bolts 17, 17 are tightened in this state, the link supporting member 12 is fixed to the casing 10 via the positioning member 11, and the upper link 4 is supported free to pivot while the thrust forces acting on the power rollers 1L, 1R are held equal.

Consequently the grip pressures acting on the power rollers 1L, 1R are the same, the torque transmitted by each roller is effectively the same, and torque transmission efficiency via the rollers is always optimized.

By finely adjusting the position of the upper link 4, the grip forces on the power rollers can therefore be equalized even when there are dimensional errors in component parts. This optimizes torque transmission efficiency even if there is no improvement in the precision of machining parts.

In the above discussion, it was assumed that positional adjustment of the power rollers was carried out after assembling the continuously variable transmission. However, if such adjustments are made for example at a predetermined interval, positional shifts of the power rollers due to aging can be absorbed so as to maintain torque transmission efficiency at an optimum level. As this adjustment can be made by adjusting the tightening force of the bolts 17, 17 facing the outer circumference of the casing 10, it can be performed simply without dismantling the transmission and without requiring any special equipment.

Figure 4:
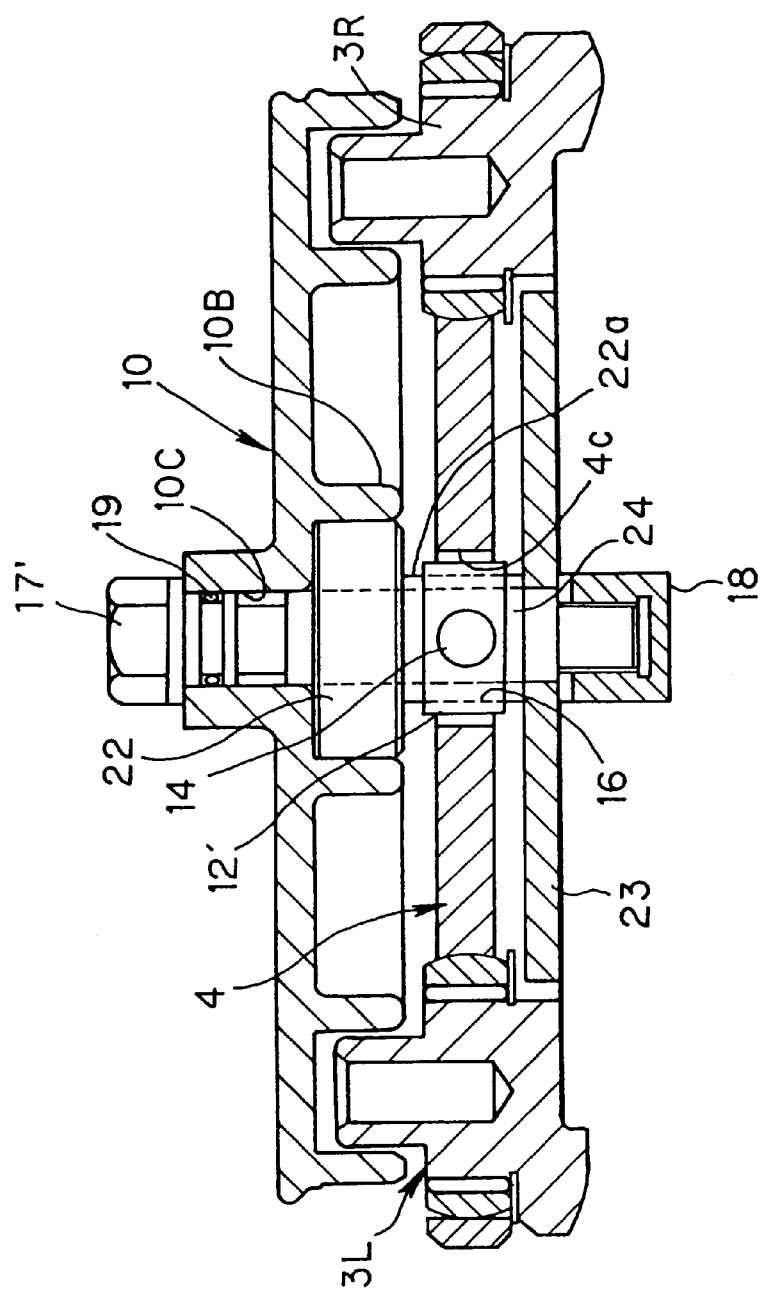
FIG. 4 is a cross-section of a link supporting member showing a different embodiment.
Figure 5:
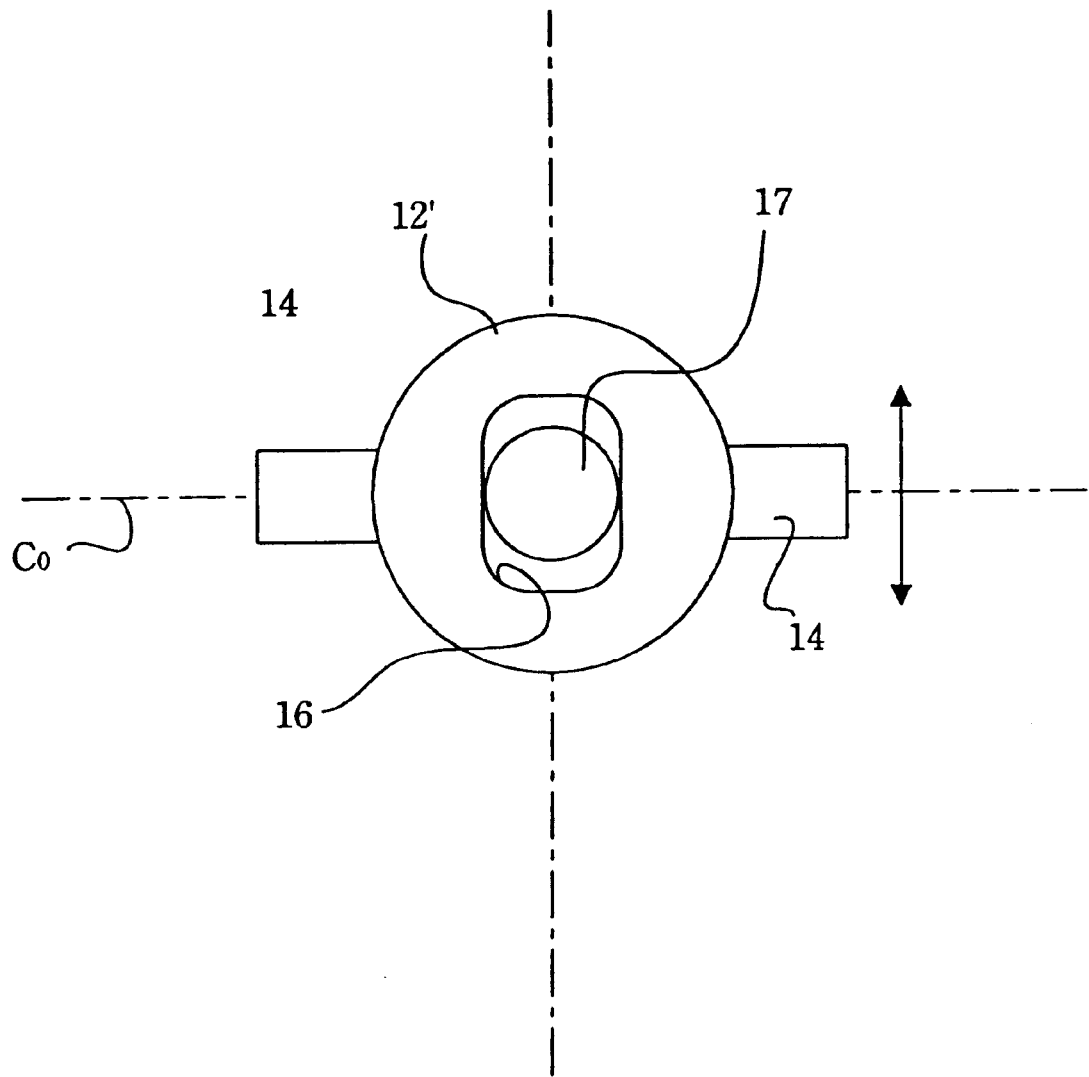
FIG. 5 is a plan view showing the link supporting member.

FIG. 4 and FIG. 5 show a second embodiment. According to this embodiment, the link supporting member 12 of the aforesaid first embodiment is replaced by a link supporting member 12' comprising a throughhole 16 through which the bolt 17 passes, the link supporting member 12' being fixed by a box-shaped nut 18 which screws onto the lower end of the vertical bolt 17. As shown in FIG. 5, a pin 14 parallel to the rotation shaft C0 of the input and output disks 20, 21 extends from both sides of the link supporting member 12'. As in the case of the aforesaid first embodiment, the upper link 4 is supported free to pivot about this pin 14 by the engaging of this pin 14 with the throughhole 40 in the upper link 4.

An oblong adjusting hole 16 through which the bolt 17' passes has the same diameter and width as that of the bolt 17' in the direction of the rotation shaft C0, but is longer than the diameter of the bolt in the longitudinal direction of the upper link 4.

The upper surface of this link supporting member 12' comes in contact with a contact part 22a under a collar 22 through which the bolt 17' passes, and its lower surface comes in contact with a collar 24 through which the bolt 17' passes.

The upper-part of the box-shaped nut 18 which screws onto the lower end of the bolt 17' is joined to a rotation stopping member 23. When the head of the bolt 17' which passes through the throughhole 10C in the upper surface of the casing 10 is tightened, rotation of the nut 18 is restricted by the rotation stopping member 23. The nut 18 and rotation stopping member 23 therefore move upwards so that the link supporting member 12' is gripped and clamped between the collars 24 and 22.

The rotation stopping member 23 comes in contact with the inner surfaces of the trunnions 3L, 3R on both sides, so it cannot move horizontally.

The outer circumference of the collar 22 engages with an annular engaging part 10B which extends downward from the inner surface of the casing 10, and the upper surface of the collar 22 is pressed against the inner surface of the casing 10 so as to position the link supporting member 12'. An O ring 19 is interposed between the inner circumference of the throughhole 10C of the casing 10 and the bolt 17' to prevent oil from leaking out of the casing 10.

To adjust the position of the power rollers 1L, 1R, the bolt 17' is loosened so that the upper link 4 can displace relative to the bolt 17' within the limits of the adjusting hole 16, and the transmission is then rotated as described above.

The input and output disks 20, 21 and the power rollers 1L, 1R rotate, and the upper link 4 displaces in the longitudinal direction until the thrust forces acting on the left and right power rollers 1L, 1R are balanced. The bolt 17 is then tightened again so that the link supporting member 12' is fixed to the casing 10 via the collars 22, 24. In this way, the upper link 4 is held in such a position that the grip pressure acting on the power rollers 1L, 1R is equalized and the transmission of rotation torque is optimized.

Next, other embodiments will be described referring to FIG. 6 to FIG. 9. These embodiments differ from the aforesaid embodiments in that the link supporting member 12 of the upper link 4 is fixed, and the link supporting member 30 of the lower link 5 is free to displace within predetermined limits in the longitudinal direction of the link.

Figure 6:
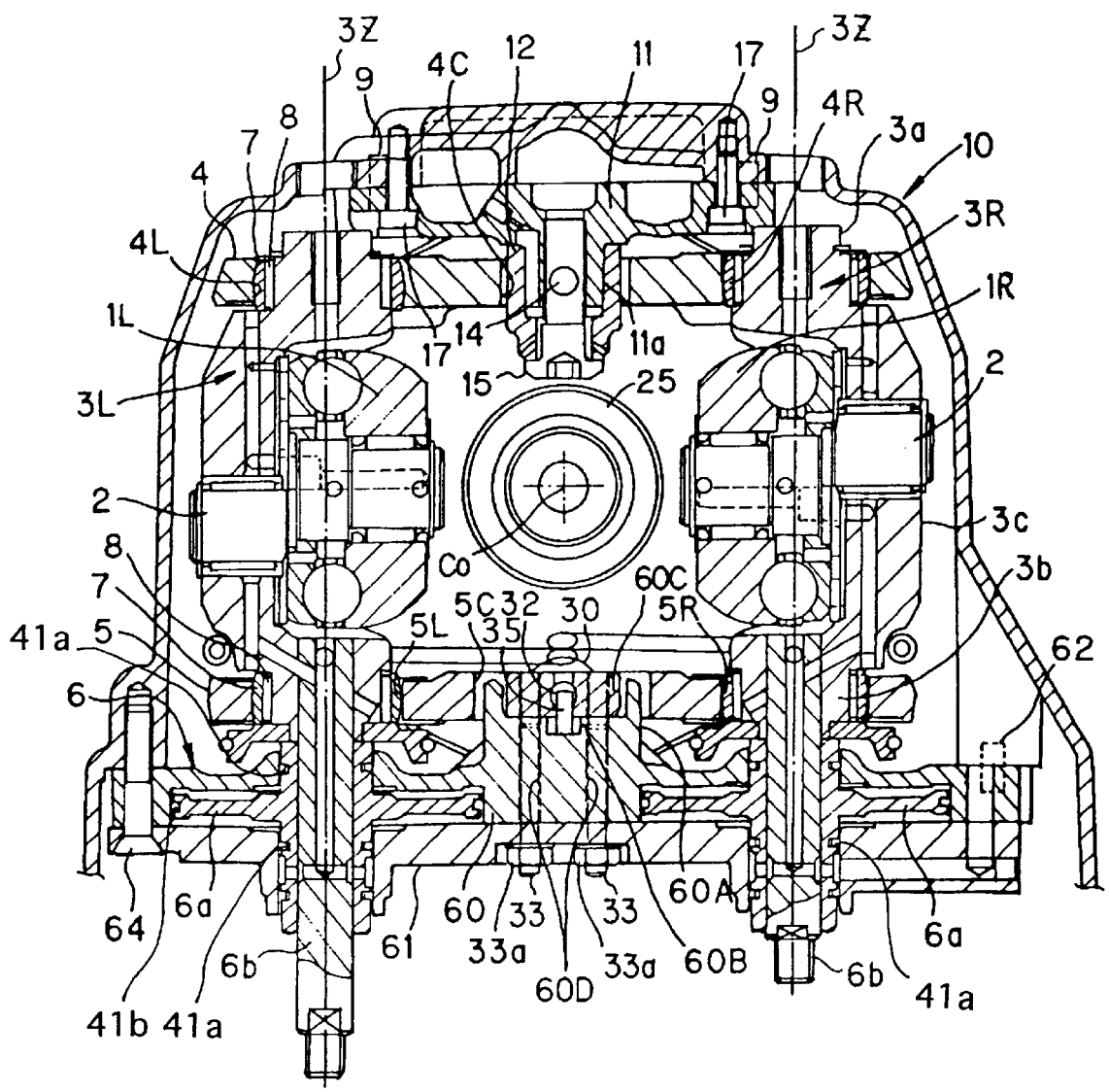
FIG. 6 is a cross-section showing another embodiments.
Figure 7:
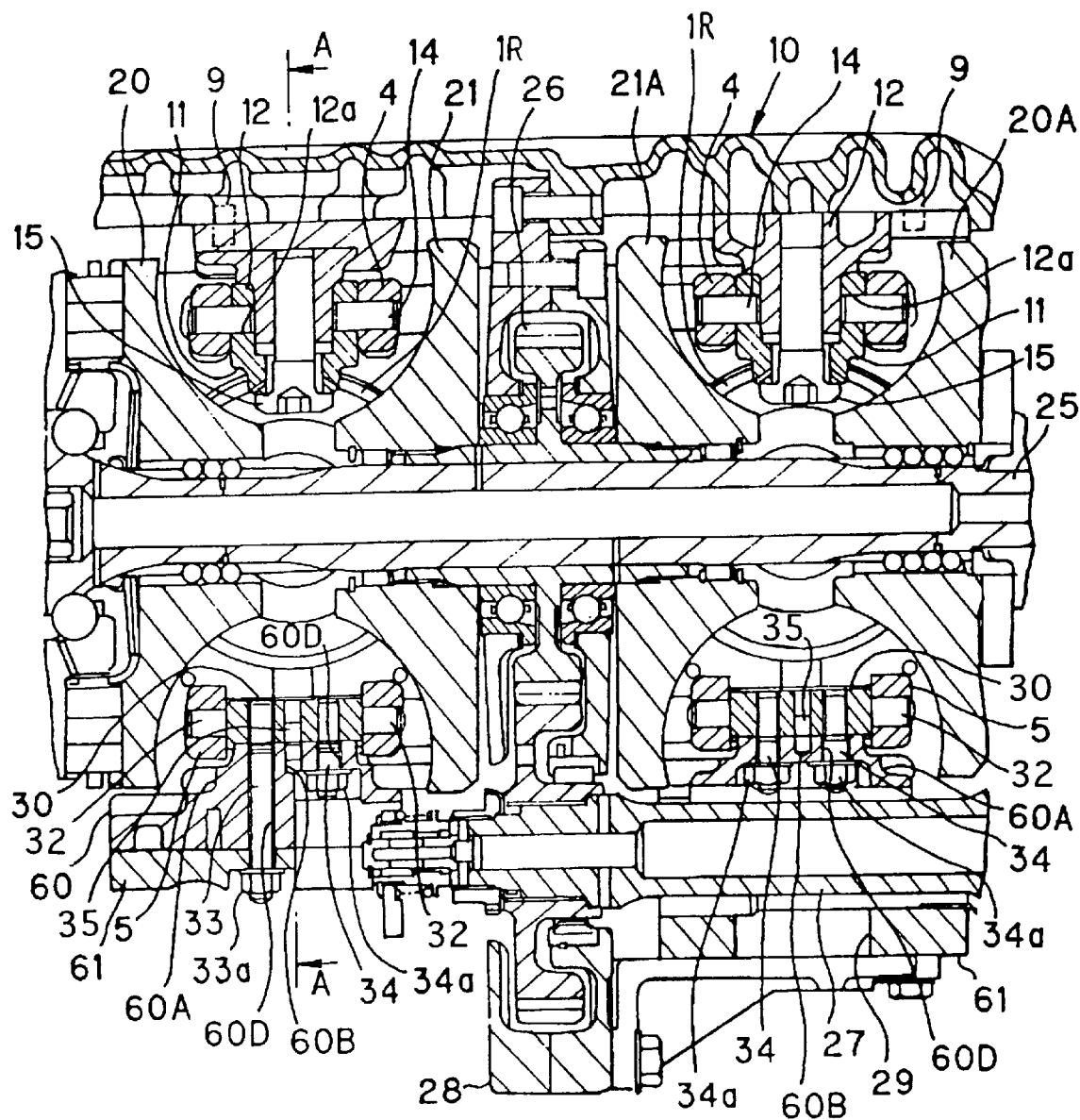
FIG. 7 is a cross-section along the line II—II of FIG. 6.
Figure 8:
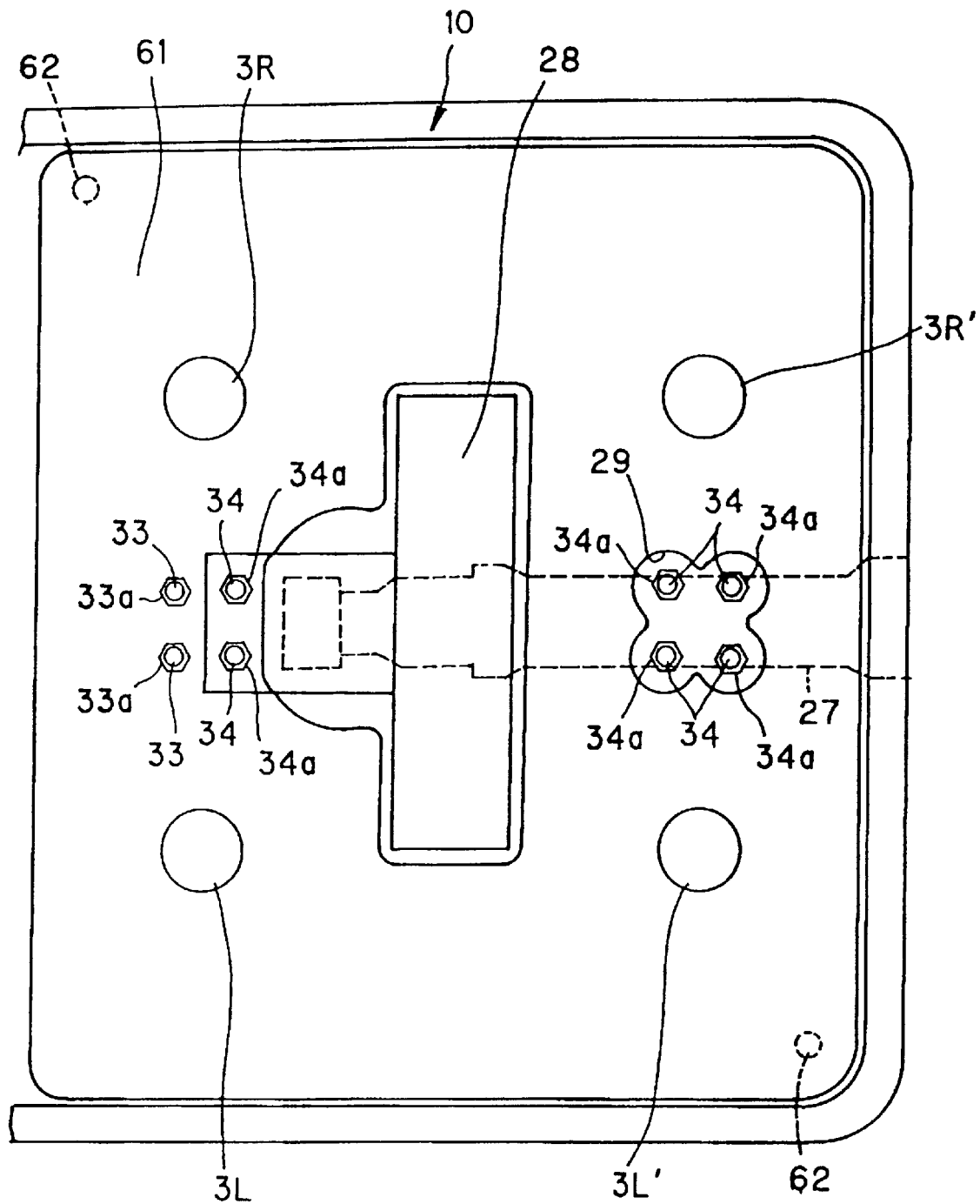
FIG. 8 is a drawing of the base.

In FIG. 6 to FIG. 8, the link supporting member 12 which supports the upper link 4 free to pivot around the pins 14 is tightened against the positioning member 11 via the bolt 15, and after the positioning member 11 is positioned against the inner surface of the casing 10 via the knock pin 9, it is joined to the casing 10 by the bolts 17, 17.

On the other hand, a concave part 60C for receiving the link supporting member 30 is provided in the upper surface of the mount 60A for fixing the link supporting member 30 which supports the lower link 5 free to pivot. The dimensions of this concave part 60C in the horizontal direction (link longitudinal direction) are set so that the link supporting member 30 is free to move within predetermined limits. The link supporting member 30, supports the lower link 5 free to pivot, by pins 32, 32 which are parallel to the rotation shaft C0 of the input/output disks 20, 21, as shown in FIG. 7.

Stud bolts 33, 34 screw into the lower surface of the link supporting member 30 of the lower link 5 in the up/down direction of FIG. 6. These stud bolts 33, 34 pass through throughholes 60D in the mount 60A and the lower base 61 of the cylinder body at a given interval apart. The link supporting member 30 is tightened to the mount 60A by screwing nuts 33a, 34a from the underside of the cylinder body 60 or the underside of the base 61.

The link supporting member 30 and mount 60A are positioned by knock pins 35 extending from the lower surface of the link supporting member 30 and adjusting holes 60B provided in the mount 60A through which the knock pin 35 pass. The adjusting holes 60B have the same width as the knock pin 35 and a predetermined length in the longitudinal direction of the lower link 5 as shown in FIG. 6. In this way, the link supporting member 30 is allowed to move within predetermined limits. The gaps between the throughholes 60D and stud bolts 33, 34 are also set within such limits as to permit this movement.

The sliding gap of the piston 6a and rod 6b which slide inside the hydraulic cylinder 6, i.e., a gap in a direction perpendicular to the axial direction of the piston, is set to approximately the same order as the range of movement of the link supporting member 30 so that the displacements of the shanks 3b of the trunnions 3L, 3R due to the motion of the link supporting member 30 are not obstructed by the hydraulic cylinder 6. Seal rings 41a, 41b are respectively mounted on the sliding parts to prevent leaking of oil from the sliding gap between the cylinder 6 and piston 6a and rod 6b.

The link supporting member 30 which supports the lower link 5 of the second toroidal speed change unit, has the same construction as that of the first toroidal speed change unit, as shown in FIG. 7.

However, as a counter shaft 27 which transmits a rotation from a gear 26 is disposed between the cylinder body 60 and base 61 of the cylinder body in the second toroidal speed change unit (right-hand side of figure), throughholes 29 for loosening and tightening the nuts 34a when the counter shaft 27 is removed, are formed in the base 61 of the cylinder body facing the nuts 34a for tightening the link supporting member 30. The cylinder body 60 and base 61 of the cylinder body are tightened to the casing 10 by bolts 64 after positioning them with knock pins 62 in a predetermined position, as shown in FIG. 6 and FIG. 8.

Therefore, when the grip pressure acting on the power rollers 1L, 1R is adjusted to be equal, and the nuts 33a, 34a of the bolts 33, 34 are loosened, the knock pin 35 of the link supporting member 30 are free to displace inside the adjusting hole 60B.

When the input disks 20, 20 A, output disks 21, 21 A and power rollers 1L, 1R are rotated in this state, the lower link 5 displaces together with the link supporting member 30 to a position where the thrust forces acting on the power roller 1L, 1R are balanced.

When the nuts 33a, 34a are tightened in this state, the link supporting member 30 is firmly joined to the cylinder body 60 and base 61 of the cylinder body, and the lower link 5 is held in a position wherein the grip pressures on the power rollers 1L, 1R are equal. Torque is therefore transmitted equally by the left and right power rollers and the performance of the toroidal continuously variable transmission is improved.

Figure 9:
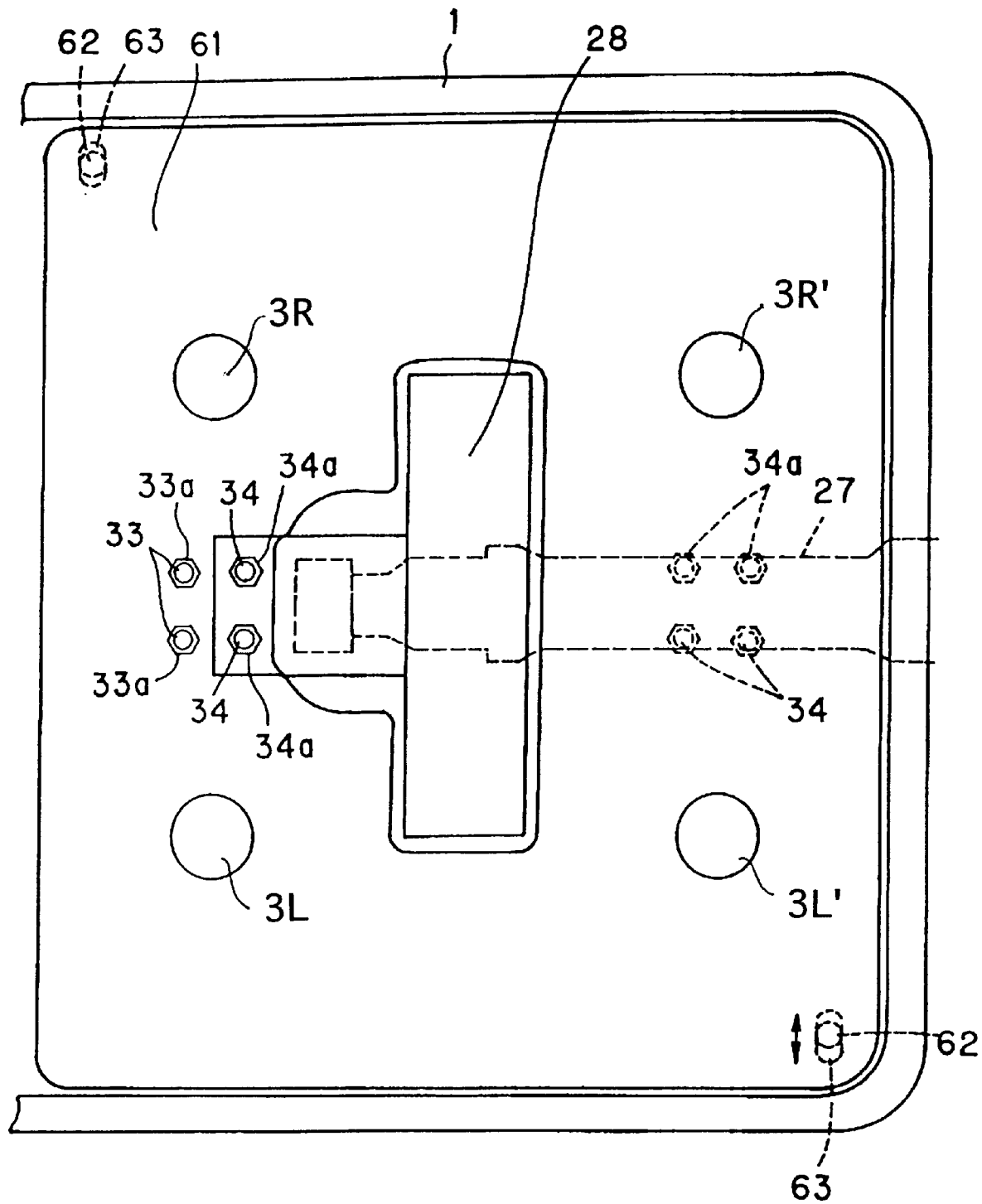
FIG. 9 is a drawing of the base showing another embodiment.

FIG. 9 shows another embodiment. According to this embodiment, in order to displace the link supporting member 30 of the lower link 5 within predetermined limits in the longitudinal direction of the link, the cylinder body 60 and base 61 to which the link supporting member 30 is attached are displaced together.

The link supporting member 30 is positioned by the knock pin 35 so that it does not move in any direction in the mount 60A, and is fixed by the bolts 33, 34. A pair of the knock pins 62 are also positioned in diagonally opposite corners of the casing 10, and adjusting holes 63 with which these pins 62 engage are formed in the cylinder body 60 and base 61. These adjusting holes 63 are long holes aligned with the longitudinal direction of the lower link 5, and permit the link supporting member 30 to move together with the cylinder body 60 and base 61 within predetermined limits along the holes in the longitudinal direction of the link only.

The bolts 64 which tighten the cylinder body 60 and base 61 to the casing 10, pass through throughholes formed in the cylinder body 60 and base 61 with a predetermined gap, and thereby permit displacement within the aforesaid predetermined limits.

Therefore, when assembly of the toroidal continuously variable transmission is complete, to adjust the positions of the power rollers 1L, 1R, the bolts 64 are loosened so as to permit the cylinder body 60 and base 61 to move relative to the casing 10. When the toroidal continuously variable transmission is in this state, the link supporting member 30 moves together with the cylinder body 60 and base 61 supported via the mount 60A in the longitudinal direction of the link to stabilize at a position in which the thrust forces acting on the power rollers 1L, 1R are balanced. When the bolts 64 are again tightened in this state, the left and right power rollers 1L, 1R are maintained with equal thrust forces, and the rotation torques can be transmitted equally.

This invention is not limited to the above embodiments, it being understood that various modifications may be made within the scope and spirit of the invention as outlined in the appended claims.

What is claimed is:

1. A toroidal continuously variable transmission comprising:
   a transmission casing,
   first and second link supporting members,
   a pair of coaxial input and output disks having toroidal conical surfaces facing each other,
   a pair of trunnions arranged in a plane perpendicular to a rotation axis of said input and output disks, and each trunnion being displaceable along and around an axis,
   a power roller rotatable supported by said trunnion about an eccentric axis of said trunnion, said power roller being gripped between said input and output disks,
   actuators for driving said pair of trunnions in mutually opposite axial directions,
   a first link connected to one end of each of said trunnions, the center part of said first link being pivotally supported about said first link supporting member,
   a second link connected to the other end of each of said trunnions, the center part of said second link being pivotally supported about said second link supporting member, and
   an adjusting means for permitting the displacement of one of said first and second link supporting members against said transmission casing within predetermined limits so as to balance the thrust forces acting on said power rollers,
   wherein said adjusting means comprises all oblong hole for restricting the displacement of said one link supporting member within said predetermined limits in an axial direction of the respective link, and further including a knock pin provided in said transmission casing and a tightening means for selectively fixing said one link supporting member to said transmission casing, said knock pin passing through said oblong hole.

2. A toroidal continuously variable transmission comprising:
   a transmission casing,
   first and second link supporting members,
   a pair of coaxial input and output disks having toroidal conical surfaces facing each other,
   a pair of trunnions arranged in a plane perpendicular to a rotation axis of said input and output disks, and each trunnion being displaceable along and around an axis,
   a power roller rotatably supported by said trunnion about an eccentric axis of said trunnion, said power roller being gripped between said input and output disks,
   actuators for driving said pair of trunnions in mutually opposite axial directions,
   a first link connected to one end of each of said trunnions, the center part of said first link being pivotally supported about said first link supporting member,
   a second link connected to the other end of each of said trunnions, the center part of said second link being pivotally supported about said second link supporting member, and
   an adjusting means for permitting the displacement of one of said first and second link supporting members against said transmission casing within predetermined limits so as to balance the thrust forces acting on said power rollers,
   wherein said adjusting means comprises a knock pin provided in either one of a body to which said actuators are fitted and said transmission casing, a corresponding adjusting hole provided in said one of said body and said transmission casing for permitting displacement of said second link supporting member in an axial direction of said link, and tightening means for selectively fixing said body to said transmission casing.

3. A toroidal continuously variable transmission comprising:
   a transmission casing,
   first and second link supporting members,
   a pair of coaxial input and output disks having toroidal conical surfaces facing each other,
   a pair of trunnions arranged in a plane perpendicular to a rotation axis of said input and output disks, and each trunnion being displaceable along and around an axis,
   a power roller rotatably supported by said trunnion about an eccentric axis of said trunnion, said power roller being gripped between said input and output disks,
   actuators for driving said pair of trunnions in mutually opposite axial directions,
   a first link connected to one end of each of said trunnions, the center part of said first link being pivotally supported about said first link supporting member,
   a second link connected to the other end of each of said trunnions, the center part of said second link being pivotally supported about said second link supporting member, and an adjusting means for permitting the displacement of one of said first and second link supporting members against said transmission casing within predetermined limits so as to balance the thrust forces acting on said power rollers, wherein said actuators comprise means for permitting displacement of said trunnion within predetermined limits in a direction perpendicular to the axial direction of said actuators.

4. A toroidal continuously variable transmission as defined in claim 3, wherein said actuators are hydraulic cylinders, said trunnions are driven in an axial direction due to the motion of pistons of said cylinders, and said displacement permitting means comprises a sliding gap between said cylinders and said pistons, and a seal ring for sealing said sliding gap.

* * * * *